United States Patent [19]

Donon

[11] 4,258,335
[45] Mar. 24, 1981

[54] GAS LASER
[75] Inventor: Jerome Donon, Paris, France
[73] Assignee: Compagnie Generale d'Electricite, Paris, France
[21] Appl. No.: 955,746
[22] Filed: Oct. 30, 1978
[30] Foreign Application Priority Data
Nov. 24, 1977 [FR] France .................................. 77 35376
[51] Int. Cl.³ .............................................. H01S 3/08
[52] U.S. Cl. .......................... 331/94.5 D; 331/94.5 G
[58] Field of Search .................. 331/94.5 G, 94.5 PE, 331/94.5 D, 94.5 C

[56] References Cited
U.S. PATENT DOCUMENTS
3,882,418  5/1975  Godard et al. ............... 331/94.5 PE
3,935,544  1/1976  Godard et al. ............... 331/94.5 PE OTHER PUBLICATIONS
James G. Small's; "An unusual kind of gas laser that puts out pulses in the ultraviolet", *Scientific American*, (Jun. 1974), pp. 122–126; conducted by C. L. Stong.

Primary Examiner—William L. Sikes
Assistant Examiner—Leon Scott, Jr.
Attorney, Agent, or Firm—Sughrue, Rothwell, Mion, Zinn and Macpeak

[57] ABSTRACT

The invention relates to a gas laser which comprises a flat plate transmission line, for laser excitation formed by an insulating plate (1) placed between two charged metal plates (2,3,7). The line also includes a semi-conductor layer (13) disposed on a surface of the insulating plate to reduce progressively the surface electric field on the insulating plate, from the edge (14) of the metal plate (2,3) to the edge (16) of the insulating plate. Application to remote detection of polluting gases in the atmosphere.

8 Claims, 3 Drawing Figures

GAS LASER

FIELD OF THE INVENTION

The present invention relates to a gas laser and in particular to a laser in which an active gaseous medium is excited by a wave of electric current propagating along a flat plate transmission line.

BACKGROUND OF THE INVENTION

It is known that a flat plate transmission line is made of an insulating plate placed between two metal plates. A current wave can be caused to propagate along the line by bringing the plates to different potentials and then generating an electric discharge between them.

When the potential difference between the metal plates is great, gas lasers of this type cease to function after a relatively short period of operation. Initially, erosion of the insulating material is observed on the edge of the transmission line, followed by peripheral breakdown between the metal plates.

Breakdown occurs even if care is taken to let the insulating plate extend beyond the metal plates.

The present invention aims to mitigate this disadvantage and to increase the reliability of gas lasers excited by means of a flat plate transmission line.

SUMMARY OF THE INVENTION

The present invention provides a gas laser which comprises:
- a flat plate transmission line for laser excitation and which includes:
  an insulating plate;
  a first metal plate which partially covers a first surface of the insulating plate, the uncovered part of the first surface forming a first peripheral strip which surrounds the edges of the first metal plate, the metal plate being divided into two distinct portions by a rectilinear slot;
  an induction coil whose terminals are connected respectively to the two portions of the first metal plate:
  a second metal plate which partially covers the second surface of the insulating plate, the uncovered part of the second surface forming a second peripheral strip which surrounds the edges of the second metal plate;
  means for maintaining an active gaseous medium in the slot;
  means for establishing a direct electric tension between the first and second metal plates, in order to set up an electric field in the insulating plate;
  means for setting up an electric discharge between one portion of the first metal plate and the second metal plate so as to form a current wave in the flat plate transmission line, the wave being suitable for generating, in the active gaseous medium, a laser beam which propagates through the slot; and
  means disposed on the first surface of the insulating plate to reduce progressively the surface electric field on the insulating plate from the edge of the first metal plate to the edge of the insulating plate.

Several particular embodiments of the present invention are described hereinbelow, by way of example, with reference to the accompanying drawing.

DESCRIPTION OF PREFERRED EMBODIMENTS

Figure 1:
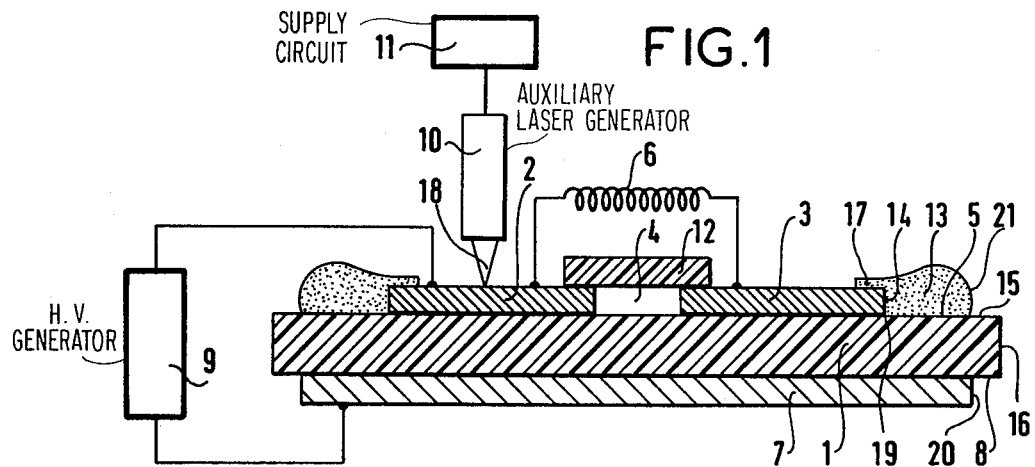
In FIG. 1 is a cross-sectional view of a first embodiment of a gas laser in accordance with the invention.

In FIG. 1, a horizontal insulating plate 1 is placed between two metal plates. One of the metal plates covers the upper surface of the insulating plate 1; it is divided into two distinct portions 2 and 3 by a rectilinear slot 4. The metal plate only partially covers the upper surface of the insulating plate 1. The uncovered part of the upper surface forms a peripheral strip 5 which extends from the edge 14 of the metal plate 2-3 to the edge 16 of the insulating plate 1; the strip therefore surrounds the metal plate 2-3. The ends of an induction coil 6 are connected to respective ones of the portions 2 and 3 of the metal plate.

Another metal plate 7 is disposed on the lower surface of the plate 1 and partially covers said surface, also leaving a peripheral strip 8 of the surface uncovered.

The two terminals of a high-voltage electric generator 9 are connected respectively to the portion 2 of the upper metal plate and to the lower metal plate 7.

An auxiliary laser generator 10 supplied by a circuit 11 effects a laser radiation pulse 18 which is directed towards the portion 2 of the plate 2-3.

An insulating plate 12 presses against the upper surface of the plate 2-3 on both sides of the slot 4.

In accordance with one disposition of the invention, a semi-conductor layer 13 is disposed on the peripheral strip 5, in contact with the edge 14 of the plate 2-3. The layer covers the whole surface of the peripheral strip 5 except for a marginal zone 15 delimited on the outside by the edge 16 of the insulating plate 1. At 17, the layer 13 also partially covers the upper surface of the metal plate 2-3 in the proximity of its edge 14.

The layer 13 is preferably formed by graphite-impregnated epoxy paint; the paint is applied with a brush, for example.

The gas laser illustrated in FIG. 1 operates as follows.

An active gas such as air or nitrogen at normal pressure is contained in the slot 4. When the active gas is air at normal atmospheric pressure, it is not necessary to dispose the plate 12 on the slot or to close off the ends of the slot. In the contrary case, the gas is enclosed in the slot by means of the plate 12 and of two windows placed at the ends of the slot.

Firstly, the flat plate transmission line constituted by the metal plates 2-3 and 7 placed on either side of the insulating plate 1 is charged by the generator 9, the portion 3 of the upper metal plate being charged via the induction coil 6. Then a pulse 18 of the auxiliary laser 10 is triggered, said pulse being concentrated at a point of the portion 2 of the upper metal plate. This results in an electric discharge at said point between the plate 2-3 and the plate 7. The discharge generates a circular current wave which propagates in the flat plate transmission line. In the particular case envisaged here, the edges 14 of the plate 2-3 are parabolic with the pulse 18 being concentrated on the focus of the parabola. The circular current wave is therefore transformed into a rectilinear wave by reflection on the edges of the parabola. The wave successively reaches the active molecules of gas situated along the slot 4, forming a laser beam which propagates along the rectilinear slot 4.

Due to the semiconductor layer 13, the surface electric field set up by the live metal plates on the surface of the insulating plate 1, for example, at 19 is reduced progressively from the edge 14 of the metal plate 2–3 towards the edge 16 of the insulating plate 1. This reduction is explained by the fact that the resistivity of the layer 13 is very much greater than that of the metal which constitutes the metal plates, which are usually copper plates.

For the reduction of the electric field to be effective, it is necessary for the metal plate 7 to cover the lower surface of the plate 1 at least up to the edge of the layer 13, as shown in the figure. In practice, the edge 20 of the metal plate 7 is substantially opposite to the edge 21 of the layer 13, on respective sides of the insulating plate. The width of the peripheral strip 8 is then substantially equal to that of the marginal zone 15. The marginal zone 15 makes it possible to avoid direct breakdown between the layer 13 and the plate 7 at the edge of the electric line, in the case where there remains an appreciable electric tension at that point.

The partial covering 17 of the plate 2–3 by the layer 13 is intended to provide excellent electric contact between the layer 13 and the plate 2–3.

It is stated by way of indication that the thickness of the layer 13 can lie between 0.1 mm and 2 mm, while its width can be about 4 to 5 cm and the width of the marginal zone can be about one centimeter.

Of course a semiconductor layer analogous to the layer 13 can also be disposed on the other surface of the plate 1. In that case, the marginal zones which are not covered by these layers will preferably have substantially equal widths.

The period of operation without breakdown of gas lasers provided with such semiconductor layers is greatly lengthened, e.g. doubled or trebled, in relation to that of gas lasers in accordance with prior art.

Figure 2:
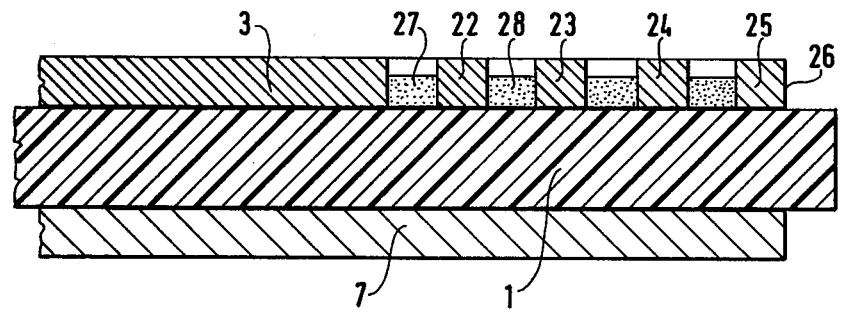
FIG. 2 is a partial cross-sectional view of a second embodiment of a gas laser in accordance with the invention.

FIG. 2 illustrates another embodiment of the invention in which annular metal rings 22, 23, 24 and 25 are spaced apart from one another round the metal plate 2–3 and are applied against the upper surface of the plate 1 in the peripheral strip. These metal plates are preferably made of the same material as the metal plates 2–3 and 7. In practice, to produce such plates, it is sufficient to dispose on the insulative plate 1 a metal plate which extends up to the end edge 26 of the plates which it is required to be applied, then to cut out the metal plate by removing the interstices such as 27 between the plate 2–3 and the nearest ring 22, or such as 28 between the two consecutive rings 22 and 23. The surface electric field is progressively reduced by depositing, in the interstices, semiconductor layers made of the same material as the layer 13 (FIG. 1).

Figure 3:
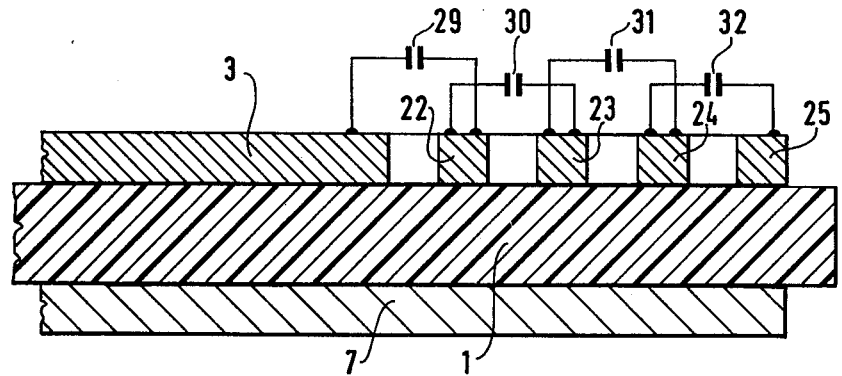
FIG. 3 is a partial cross-sectional view of a third embodiment of a gas laser in accordance with the invention.

In the case illustrated in FIG. 3, peripheral metal rings 22 to 25 are disposed in an exactly analogous way to that illustrated in FIG. 2, but here, the semiconductor layers are replaced by capacitors such as 29, 30, 31, 32. The plates of the capacitor 29 are connected respectively to the plate 2–3 and to the plate 22, while the plates of each of the other capacitors are connected respectively to two consecutive rings. These connections can be made with a conductive adhesive.

Here, the surface electric field is reduced in steps, from one metal ring to the next by capacitors.

The operation of the lasers illustrated in FIGS. 2 and 3 is entirely similar to that of the laser illustrated in FIG. 1.

Gas lasers in accordance with the invention can be applied to the remote detection of polluting gases in the atmosphere.

I claim:

1. A gas laser comprising:
   a flat plate transmission line for laser excitation and which includes:
   an insulating plate;
   a first metal plate which partially covers a first surface of the insulating plate, the uncovered part of the first surface forming a first peripheral strip which surrounds the edges of the first metal plate, said metal plate being divided into two distinct portions by a rectilinear slot;
   an induction coil having terminals connected respectively to the two portions of the first metal plate;
   a second metal plate partially covering the second surface of the insulating plate, the uncovered part of the second surface forming a second peripheral strip which surrounds the edges of the second metal plate and is of a width less than that of said first peripheral strip;
   means for maintaining an active gaseous medium in the slot;
   means for establishing an electric tension between the first and second metal plates, in order to set up an electric field in the insulating plate;
   means for setting up an electric discharge between one portion of the first metal plate and the second metal plate so as to form a current wave in the flat plate transmission line, the wave being suitable for generating, in the active gaseous medium, a laser beam which propagates through the slot; the improvement comprising:
   means disposed on the first surface of the insulating plate for reducing progressively the surface electric field on the insulating plate from the edge of the first metal plate to the edge of the insulating plate when the current wave is flowing through the plate transmission line.

2. A gas laser according to claim 1, further including means disposed on the second surface of the insulating plate for reducing progressively the surface electric field on the insulating plate from the edge of the second metal plate to the edge of the insulating plate.

3. A gas laser according to claim 1, wherein the means disposed on the first surface of the insulating plate to reduce progressively the surface electric field comprises a layer of semiconductor material deposited on the first peripheral strip and being in contact with the edge of the first metal plate.

4. A gas laser according to claim 3, wherein the layer of semiconductor material covers the whole surface of the first peripheral strip except for a marginal zone delimited on the outside by the edge of the insulative plate, the width of the second peripheral strip being substantially equal to the width of the marginal zone.

5. A gas laser according to claim 3, wherein said layer of semiconductor material is made of graphite-impregnated epoxy paint.

6. A gas laser according to claim 4, wherein the layer of semiconductor material is made of graphite-impregnated epoxy paint.

7. A gas laser according to claim 1, wherein the means disposed on the first surface of the insulating plate to reduce progressively the surface electric field comprises:
- a plurality of consecutive peripheral metal rings disposed on the first peripheral strip and spaced apart from one another round the edge of the first metal plates and including one metal ring which is nearest to the edge of the first metal plate;
- at least one capacitor having plates connected respectively to the first metal plate and to said metal ring which is nearest to the edge of the first metal plate; and
- at least one other capacitor, said at least one other capacitor having plates connected respectively to two consecutive metal rings.

8. A gas laser according to claim 1, wherein the means disposed on the first surface of the insulating plate to reduce progressively the surface electric field comprises:
- a plurality of peripheral metal rings disposed on the first peripheral strip and closely spaced apart from one another round the edge of the first metal plate and including one metal ring which is situated nearest to the edge of the first metal plate; and
- layers of semiconductor meterial deposited on the first peripheral strip in the interstices situated firstly between the metal and secondly between the edge of the first metal plate and the metal ring situated nearest to the edge of the first metal plate.

* * * * *